United States Patent
Thomson et al.

(10) Patent No.: US 7,792,052 B1
(45) Date of Patent: *Sep. 7, 2010

(54) METHOD AND SYSTEM FOR TESTING AND OPTIMIZING THE PERFORMANCE OF A RADIO COMMUNICATION DEVICE

(75) Inventors: John S. Thomson, Union City, CA (US); William J. McFarland, Los Altos, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 12/236,818

(22) Filed: Sep. 24, 2008

Related U.S. Application Data

(63) Continuation of application No. 10/254,181, filed on Sep. 24, 2002, now Pat. No. 7,447,163.

(60) Provisional application No. 60/325,077, filed on Sep. 25, 2001.

(51) Int. Cl.
*H04J 1/16* (2006.01)

(52) U.S. Cl. .................................. 370/252; 370/469

(58) Field of Classification Search .................. None
See application file for complete search history.

(56) References Cited

U.S. PATENT DOCUMENTS 6,671,284 B1 * 12/2003 Yonge et al. ............... 370/462
6,940,823 B1 * 9/2005 Park et al. ................. 370/252
2002/0054578 A1 5/2002 Zhang et al.
2002/0110156 A1 8/2002 Ozluturk
2003/0063678 A1 4/2003 Crawford
2003/0228861 A1 12/2003 Leung et al.
2004/0141522 A1 7/2004 Texerman et al.
2005/0122924 A1 6/2005 Hwang et al.
2006/0062192 A1 3/2006 Payne \* cited by examiner

*Primary Examiner*—Seema S Rao
*Assistant Examiner*—Rhonda Murphy
(74) *Attorney, Agent, or Firm*—Bever, Hoffman & Harms, LLP; Jeanette S. Harms

(57) ABSTRACT

A radio communication device is tested by forwarding relevant signal characteristic data derived at the physical (PHY) layer to the media access control (MAC) layer for processing, analysis and feedback to the radio circuit to improve performance. The relevant signal characteristics are forwarded to the MAC within (appended to) a data packet. Thus, the relevant signal characteristic is forwarded to the MAC along an existing data path (a path originally designed to transfer the receive frame only, but now transfers the combined receive frame with the attached radio characteristic). The radio characteristic may be used for testing and/or tuning the radio circuit. In one embodiment, the radio characteristic is a frequency domain representation of a received signal. The radio is tuned based on a channel estimate derived from comparison of frequency domain representations of transmitted and received signals.

33 Claims, 11 Drawing Sheets

METHOD AND SYSTEM FOR TESTING AND OPTIMIZING THE PERFORMANCE OF A RADIO COMMUNICATION DEVICE

CLAIM OF PRIORITY

This invention claims priority to the following U.S. provisional patent application, which is incorporated herein by reference in its entirety:

Thomson et al, Provisional Application Ser. No. 60/325,077, entitled "METHOD AND SYSTEM FOR TESTING AND OPTIMIZING THE PERFORMANCE OF A RADIO COMMUNICATION DEVICE", filed, Sep. 25, 2001.

This invention is a continuation of U.S. application Ser. No. 10/254,181 entitled "METHOD AND SYSTEM FOR TESTING AND OPTIMIZING THE PERFORMANCE OF A RADIO COMMUNICATION DEVICE", filed Sep. 24, 2002.

BACKGROUND OF THE INVENTION

1. Field of the Invention

The present invention relates generally to the field of radio communications and more specifically to the field of testing radio communication devices.

2. Background Discussion

The market for home networking is developing at a phenomenal rate. Service providers from cable television, telephony and digital subscriber line markets are vying to deliver bundled services such as basic telephone service, Internet access and entertainment directly to the consumer. Collectively these services require a high-bandwidth network that can deliver 30 Mbits/s or even high rates. The Institute of Electrical and Electronic Engineers (IEEE) 802.11a standard describes a cost-effective, robust, high-performance local-area network (LAN) technology for distributing this multimedia information within the home. Networks that will operate in accordance with standard 802.11a will use the 5-GHz UNII (unlicensed National Information Infrastructure) band and may achieve data rates as high as 54 Mbits/s, a significant improvement over other standards-based wireless technology. The 802.11a standard has some unique and distinct advantages over other wireless standards in that it uses orthogonal frequency-division multiplexing (OFDM) as opposed to spread spectrum, and it operates in the clean band of frequencies at 5 GHz.

OFDM is a technology that resolves many of the problems associated with the indoor wireless environment. Indoor environments such as homes and offices are difficult because the radio system has to deal with a phenomenon called "multipath." Multipath is the effect of multiple received radio signals coming from reflections off walls, ceilings, floors, furniture, people and other objects. In addition, the radio has to deal with another frequency phenomenon called "fading," where blockage of the signal occurs due to objects or the position of a communications device (e.g., telephone, TV) relative to the transceiver that gives the device access to the cables or wires of the cable TV, telephone or internet provider.

OFDM has been designed to deal with these phenomena and at the same time utilize spectrum more efficiently than spread spectrum to significantly increase performance. Ratified in 1999, the IEEE 802.11a standard significantly increases the performance (54 Mbits/s vs. 11 Mbits/s) of indoor wireless networks.

The ability of OFDM to deal with multipath and fading is due to the nature of OFDM modulation. OFDM modulation is essentially the simultaneous transmission of a large number of narrow band carriers sometimes called subcarriers, each modulated with a low data rate, but the sum total yielding a very high data rate. FIG. 1a illustrates the frequency spectrum of multiple modulated subcarriers in an OFDM system. To obtain high spectral efficiency the frequency response of the subcarriers are overlapping and orthogonal, hence the name OFDM. Each narrowband subcarrier can be modulated using various modulation formats such as binary phase shift keying (BPSK), quatenary phase shift keying (QPSK) and quadrature amplitude modulation QAM (or the differential equivalents). The 802.11a standard specifies that each 20 MHz channel has 52 subcarriers covering 16.5 MHz of the 20 MHz, leaving 3.5 MHz to be used for preventing interference between channels.

Since the modulation rate on each subcarrier is very low, each subcarrier experiences flat fading in multipath environment and is relatively simple to equalize, where coherent modulation is used. The spectrums of the modulated subcarriers in an OFDM system are not separated but overlap. The reason why the information transmitted over the carriers can still be separated is the so-called orthogonality relation giving the method its name. The orthogonality relation of the subcarriers requires the subcarriers to be spaced in such a way that at the frequency where the received signal is evaluated all other signals are zero. In order for this orthogonality to be preserved it helps for the following to be true:

1. Synchronization of the receiver and transmitter. This means they should assume the same modulation frequency and the same time-scale for transmission (which usually is not the case).
2. The analog components, part of transmitter and receiver, are of high quality.
3. The multipath channel needs to be accounted for by placing guard intervals which do not carry information between data symbols. This means that some parts of the signal cannot be used to transmit information.

In addition to an improved modulation scheme such as provided by the 802.11a protocol, also needed in the art is an improved method of testing and dynamically improving the performance of radio communication devices, particularly those compatible with the OFDM-based 802.11a standard. However, testing assembled radios can be expensive. In the available art, dedicated test and measurement equipment are often utilized at significant cost. Some devices use dedicated test interfaces other than the standard receive data interface, thereby sacrificing valuable I/O bandwidth and real estate to enable testing.

SUMMARY OF THE INVENTION

A method, system, and apparatus are provided for testing and improving the performance of a radio communication device by forwarding relevant signal characteristic data derived at the physical (PHY) layer to the media access control (MAC) layer for processing, analysis, and feedback to refine operation of the radio communication device. The radio communication device may be, for example, a radio link, radio circuit, receiver, repeater, etc. A preferred method of forwarding comprises appending the data to the decoded received data and forwarding to the MAC within a data packet. The inventive system and method may also be used during device operation to improve performance.

BRIEF DESCRIPTION OF THE DRAWINGS

The present invention is illustrated by way of example, and not limitation, in the figures of the accompanying drawings in which like references denote similar elements, and in which.

DETAILED DESCRIPTION

In the following description, for purposes of explanation, numerous specific details are set forth in order to provide a thorough understanding of the present invention. However, after reviewing this description, it will be evident to one of ordinary skill in the art that the present invention may be practiced in a variety of radio frequency circuits, especially an orthogonal frequency division multiplexing circuit, without these specific details. In other instances, well-known operations, steps, functions and elements are not shown in order to avoid obscuring the invention.

Parts of the description will be presented using terminology commonly employed by those skilled in the art to convey the substance of their work to others skilled in the art, such as orthogonal frequency division multiplexing, fast fourier transform (FFT), angle-vector and vector-angle conversions, pilots, subcarrier, and so forth. Various operations will be described as multiple discrete steps performed in turn in a manner that is most helpful in understanding the present invention. However, the order of description should not be construed as to imply that these operations are necessarily performed in the order that they are presented, or even order dependent. Lastly, repeated usage of the phrases "in one embodiment," "an alternative embodiment," or an "alternate embodiment" does not necessarily refer to the same embodiment, although it may.

Figure 1A:
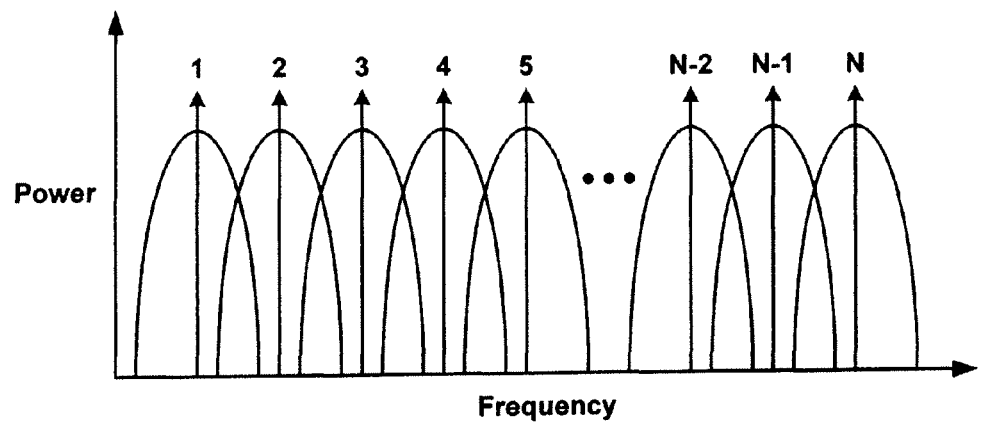
FIG. 1a illustrates the frequency spectrum of multiple modulated subcarriers in an OFDM system.
Figure 1B:
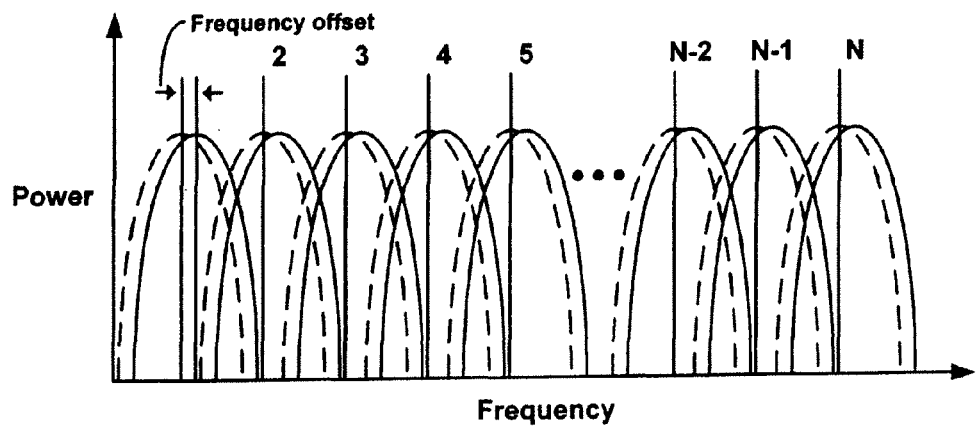
FIG. 1b illustrates the effect of the lack of synchronization on the frequency spectrum 10 of multiple subcarriers.
Figure 2:
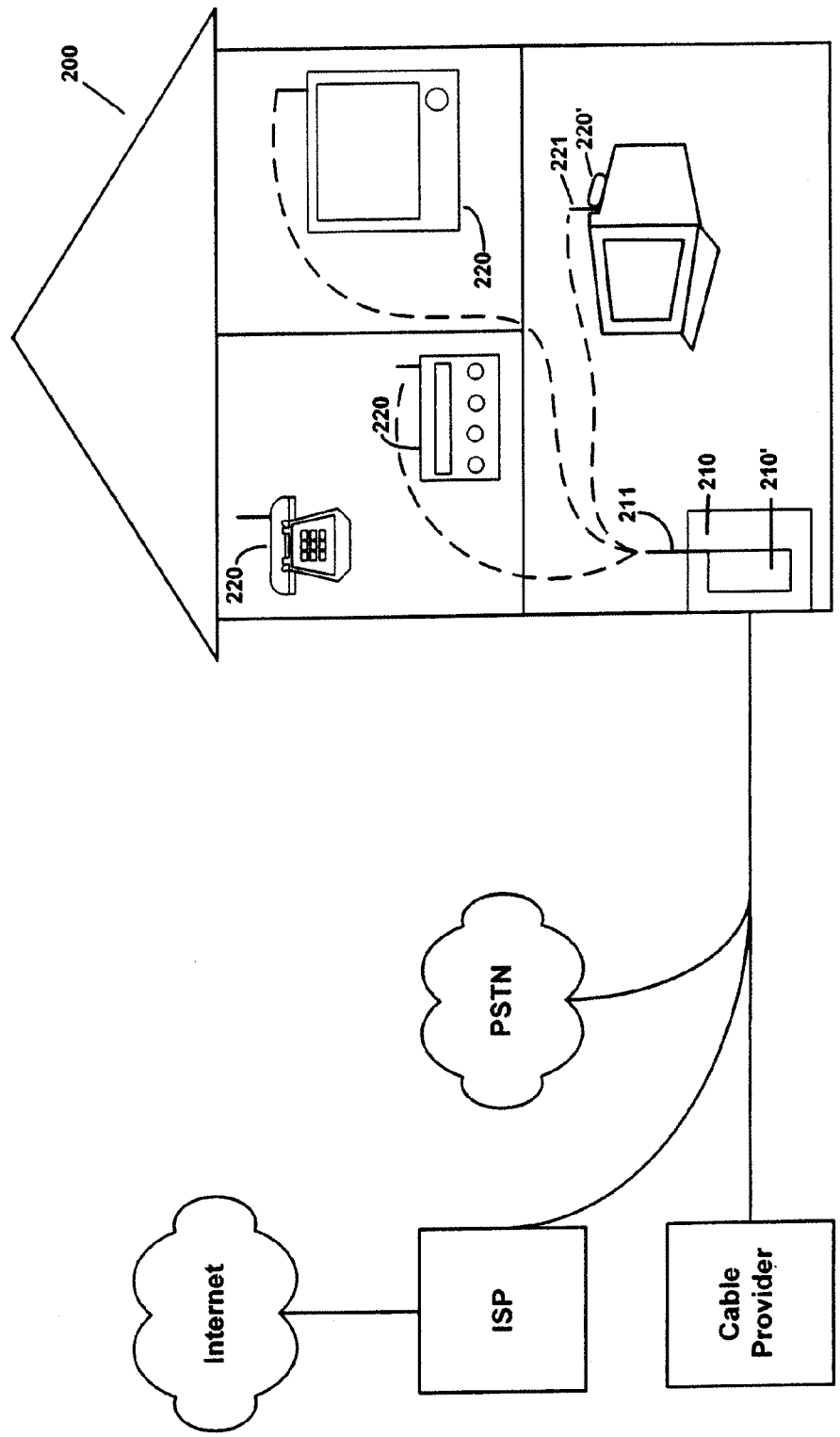
FIG. 2 illustrates a communication system according to one embodiment of the present invention.

FIG. 2 illustrates a communication system according to one embodiment of a system in which the present invention may be utilized. System 200 includes a gateway 210 which is connected via a cable (or multiple cables) to the public switched telephone network (PSTN), a cable television system, an Internet service provider (ISP), or some other system. Gateway 210 includes a transceiver 210' and antenna 211. Appliance 220 includes a transceiver 220' and antenna 221. Appliance 220 could be a television, computer, telephone, or some other appliance. Transceiver 210' provides transceiver 220' with a wireless connection to the systems which are connected to gateway 210. According to one embodiment, transceivers 210' and 220' communicate in accordance with the IEEE 802.11a standard. Consequently, each of transceivers 210' and 220' includes a receiver and a transmitter that communicate information formatted according to the 802.11a standard. In alternative embodiments, as indicated below, transceivers 210' and 220' may have design features that deviate from the IEEE 802.11a standard. For example, the present invention can be practiced in a system that has a packet structure that is different from the 802.11a standard; e.g., different number of symbols having a known amplitude and phase, different organization and number of guard intervals, data symbols, long symbols. Furthermore, the present invention can be practiced with sampling rates specified by the standard or other rates, different pilot organization, and a different number of carriers, among other differences.

Figure 3:
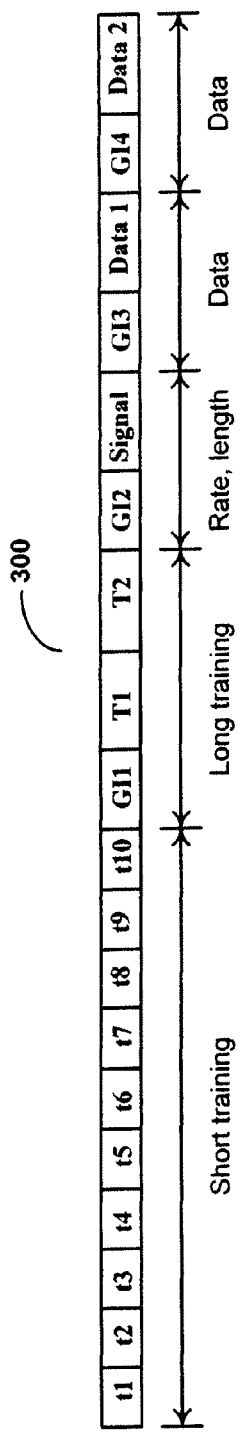
FIG. 3 illustrates the packet structure that the IEEE 802.11a standard requires for information transmission between two transceivers.

FIG. 3 illustrates the packet structure that the IEEE 802.11a standard requires for information transmission between two transceivers. A receiver in transceiver 210' or 220' is designed to accept a packet such as packet 300 and to derive timing information, data, and other information from the packet. For example, in packet 300, the first 10 symbols (t1 to t10), which are referred to as the shorts, are repeated random sequences that a receiver uses for detecting symbol timing and coarse carrier frequency offset. GI1 is the cyclic prefix of the two long symbols T1 and T2, and is sometimes referred to as a guard interval because of its use as a rough inter-symbol boundary for absorbing the effect of multipath. GI1 is made long enough such that if short symbol t10 undergoes multipath, symbol t10 will partially "smear" into GI1 without affecting T1. T1 and T2, referred to as the longs, are used for channel estimation, fine frequency offset estimation, and fine symbol timing adjustment. Having a relatively accurate channel estimate is essential to proper decoding of data symbols. There are several factors that can affect channel estimation validity: changes between the long symbols, on which the channel estimate is based, and the data symbols, frequency offset between the receiver and transmitter, timing drift, and phase noise. The system provides for a channel estimate based on the long symbols to be adjusted based on successive estimates of pilot signals in a data symbol. The successive estimates allow the original channel estimate to be made updated despite the effects of magnitude change, phase noise, timing drift, and frequency offset.

According to one embodiment, each short symbol takes 0.8 μs, allowing altogether 8 μs to perform signal detection, automatic gain control (AGC) and coarse symbol timing and frequency offset estimation. According to one embodiment, GI1 takes 1.6 μs, twice the amount of the usual cyclic prefix between data symbols, to absorb the computation latency necessary in performing the above functions. After the shorts, GI1 provides a rough inter-symbol boundary which allows the two longs, T1 and T2, to be captured without multipath effects, as the relatively long GI1 is sized to provide an ample buffer zone to absorb any error in symbol boundary. According to one embodiment, T1 and T2 each take up 3.2 μs, and are used to derive two estimates of the channel characteristics, as the data bits transmitted in T1 and T2 are known at the receiver. The two channel estimations are combined and manipulated to form a reference channel estimate for the following data symbols. After the longs, the packet enters into data symbols. Each data symbol is 3.2 μs long and preceded by a cyclic-prefix of 0.8 μs. The cyclic prefix is used to absorb delay spread caused by multipath so that the OFDM symbols can remain orthogonal. The first symbol is a SIGNAL symbol, which is, according to one embodiment, transmitted in binary phase shift keying (BPSK) with a ½-rate code. The SIGNAL symbol is transmitted in BPSK because all systems will be able to communicate in the BPSK ½-rate code, but all may not be able to communicate in quadrature amplitude modulation. The SIGNAL symbol needs to be detected correctly, as it contains the information needed for decoding the rest of the packet, hence the use of BPSK with the ½-rate code. The data symbols can be transmitted in BPSK, quaternary phase shift keying (QPSK), 16-quadrature amplitude modulation (QAM), or 64-QAM with various degrees of error correction, to provide a scaleable set of data rates in response to different channel conditions.

Figure 4A:
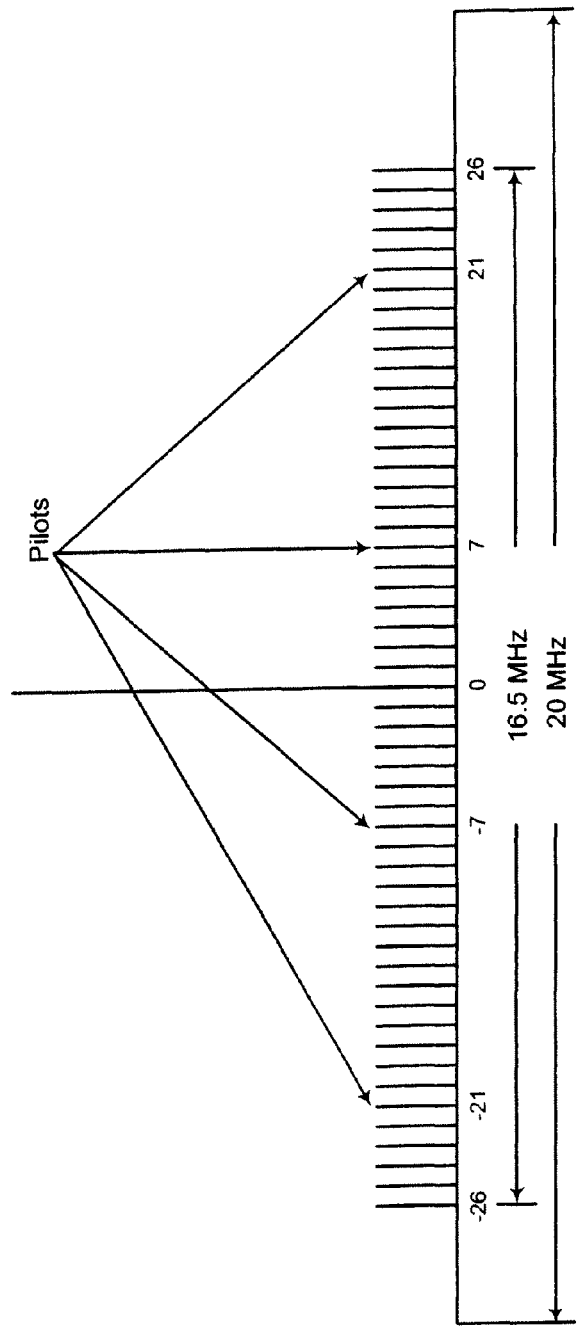
FIG. 4a illustrates subcarriers and pilots of an OFDM signal in accordance with the 802.11a standard.

FIG. 4a illustrates subcarriers and pilots of an OFDM signal in accordance with the 802.11a standard. According to the 802.11a standard an OFDM signal has 52 subcarriers. The 52 subcarriers are numbered from −26 to +26 and occupy 16.5625 MHz of the 20 MHz bandwidth allocated to one 802.11a channel. The 0 subcarrier is ignored because direct current at the receiver prevents reliable transmission of information on that subcarrier. For an OFDM long symbol signal, all the 52 subcarriers have a known amplitude and phase which allows a channel estimate to be determined for communication between a transmitter and receiver. In a long symbol, four of the 52 subcarriers are referred to as pilot signals even though all the subcarriers behave like pilot signals because their amplitude and phase are also known. The +/−21 and the +/−7 subcarriers are pilot signals. In contrast, for an OFDM data symbol, 48 of the 52 subcarriers are non-deterministic data carriers, while the remaining 4 carriers are pilot signals whose amplitude and phase are known.

According to one embodiment, a channel estimate is derived from the long symbols by taking a fourier transform of samples of the long symbols. The fourier transform of the long symbol samples is the frequency domain representation of the long symbols as received at the receiver after modification by the channel between the receiver and transmitter. Since the long symbols have a known amplitude and phase, the frequency domain representation of the long symbols as transmitted by the transmitter can be and is stored at the receiver. According to one embodiment, the channel estimate is derived by taking the quotient of the frequency domain representation of the long symbols as received at the receiver and the frequency domain representation of the long symbols as transmitted by the transmitter.

By inverting the channel estimate, the phase and magnitude correction factor for each subcarrier can be determined. The correction factors of the inverted channel estimate are used to correct the frequency domain representation of each data symbol that is received at the receiver. The frequency domain representation of each data symbol is a sequence of complex values, where each complex value is representative of the phase and amplitude of a data symbol subcarrier as received at the receiver. For each data symbol subcarrier the correction factor is a complex value which is used to make an adjustment to the phase and amplitude of the data symbol subcarrier.

With time, due to phase noise, timing offset, and frequency offset, the correction factors become inaccurate and prevent accurate decoding of a received data symbol. The present invention leverages mechanisms for adjusting the inverted channel estimate, both magnitude and phase, so that the data symbols can be accurately decoded.

The mechanisms involve, monitoring the total change in phase of each pilot in a data symbol and monitoring the intersymbol change in the average power of the pilots. By monitoring how the total change in phase of each pilot in a data symbol changes over time in comparison to the corresponding pilot of the long symbols, the effects of phase noise, timing drift, and frequency offset between the receiver and transmitter can be accounted for and the inverse channel estimate adjusted. Additionally, by monitoring the change in the average power of the pilots of a data symbol in comparison to the average power of the pilots of the long symbols, the effect of changes in magnitude can be accounted for and the inverse channel estimate adjusted.

Figure 4B:
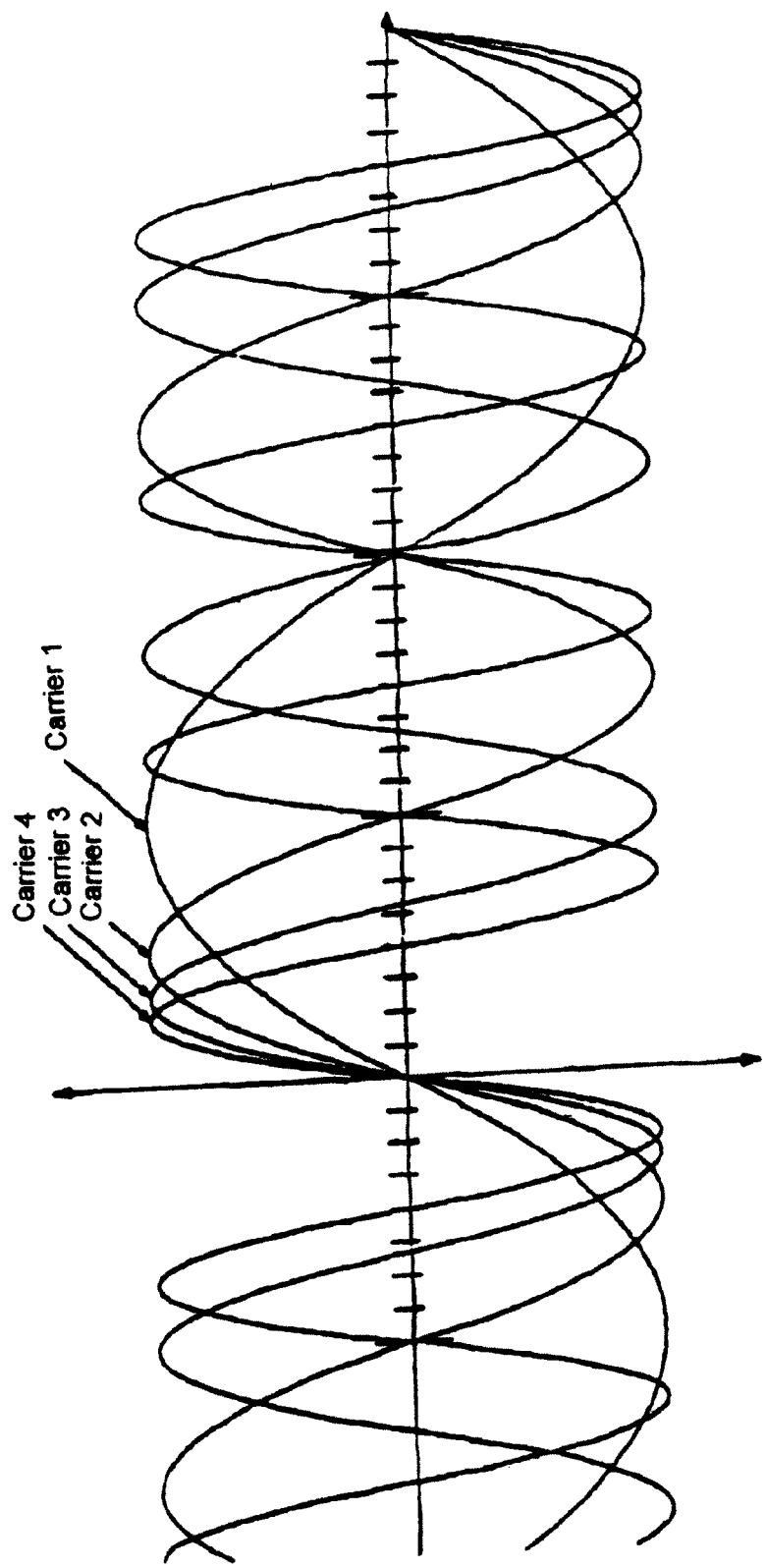
FIG. 4b illustrates several discrete waveforms that together form a part of an OFDM signal in accordance with the 802.11a standard.

FIG. 4b illustrates several discrete waveforms that together form a part of an OFDM signal in accordance with the 802.11a standard. While all the waveforms are shown to be of equal amplitude and phase, it should be appreciated that other waveforms with unequal amplitudes and phases are possible and are encompassed by the present invention. Assume for the purposes of the discussion that the waveforms are representative of the waveforms of a long symbol. If the long symbol is sampled early, the phase of each waveform will be proportional to the product of the frequency of the waveform and the number of samples (i.e., clock cycles) that the sampling of the waveforms is early. There is a linear relationship between the angle of a subcarrier and the timing offset measured in the number of clock cycles by which the sampling is early. Assuming a 40 MHz sampling rate, for every 128 clock cycles subcarrier 1 completes one cycle. Consequently, for every clock cycle that subcarrier 1 is sampled early the phase of the subcarrier is rotated by −π/64. So, for example, if the symbol timing were early by one clock cycle, we would expect subcarrier 3 to rotate by −3π/64 radians, and subcarrier −3 to rotate by 3π/64 radians. The amount of rotation in radians, generally, is given by equation 1.0 below.

$$\text{Rotation} = -(\text{Numclocks\_early})(\text{Subcarrier\_number})\pi/64 \qquad \text{Equation 1.0}$$

Numclocks_early is the number of clock cycles by which the symbol timing is off. Subcarrier_number is the number of the subcarrier for which rotation is to be determined. As indicated above, Subcarrier_number varies from −26 to +26.

Figure 4C:
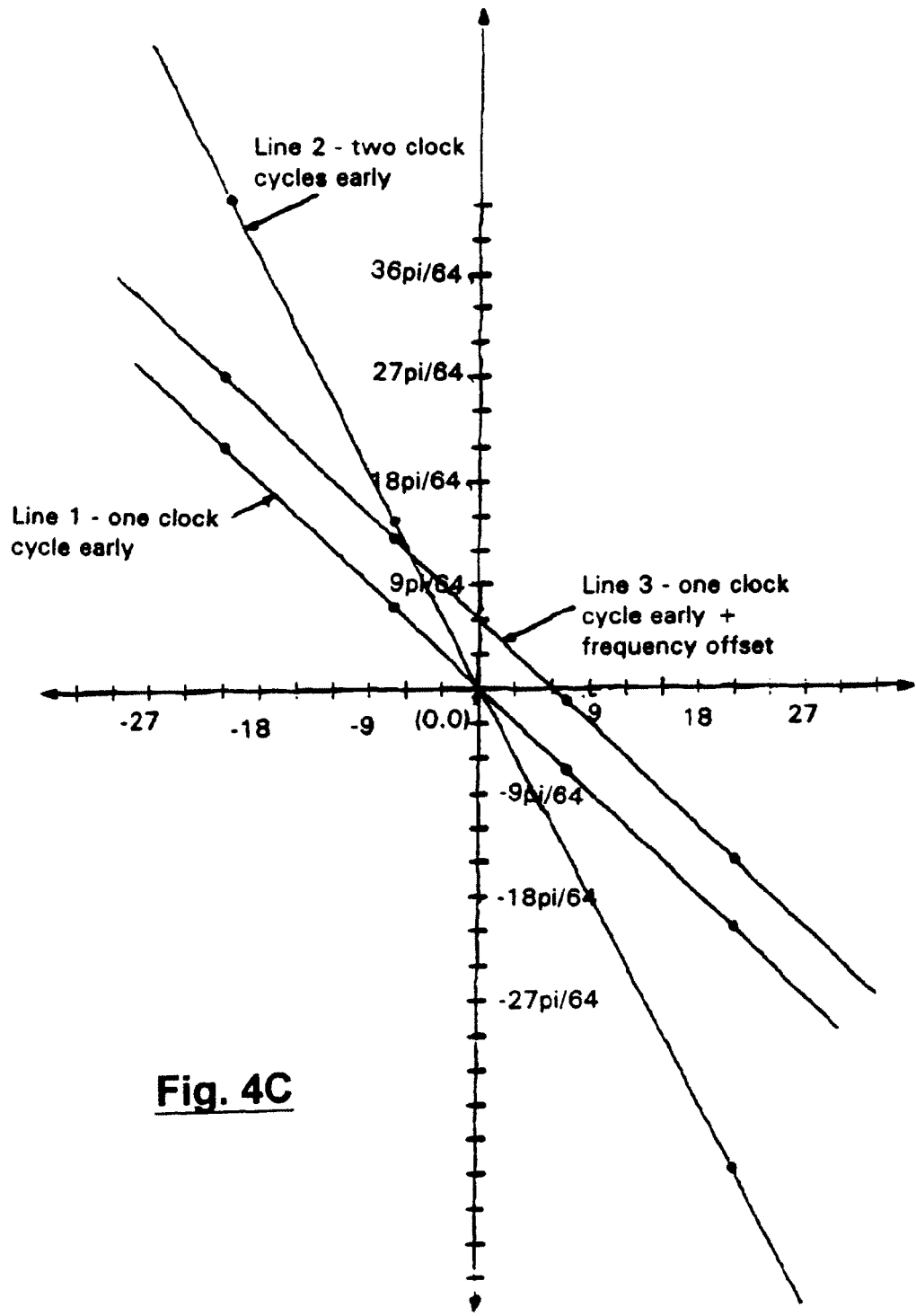
FIG. 4c illustrates a graph of the total change in phase of pilots versus subcarrier number for early sampling by various clock cycles.

FIG. 4c illustrates a graph of the total change in phase of pilots versus subcarrier number for early sampling by various clock cycles. Line 1 is the line through the points associated with each pilot where sampling is one clock cycle early. Line 2 is the line through the points associated with each pilot where sampling is two clock cycles early. Line 3 is the line through the points associated with each pilot where sampling is one clock cycle early and there is a frequency offset between receiver and transmitter. As shown in FIG. 4b, the waveforms are not influenced by a frequency offset between the receiver and transmitter. Had there been a frequency offset, the waveforms of FIG. 4b would have been either compressed or expanded. Assuming that there is a frequency offset, it would affect the phase of all the subcarriers equally. In terms of the pilots of FIG. 4c, the phases of each of the pilots would increase by the same amount which translates into a shift up or down along the phase axis. Consequently, line 3 is a shifted version of line 1.

Figure 4D:
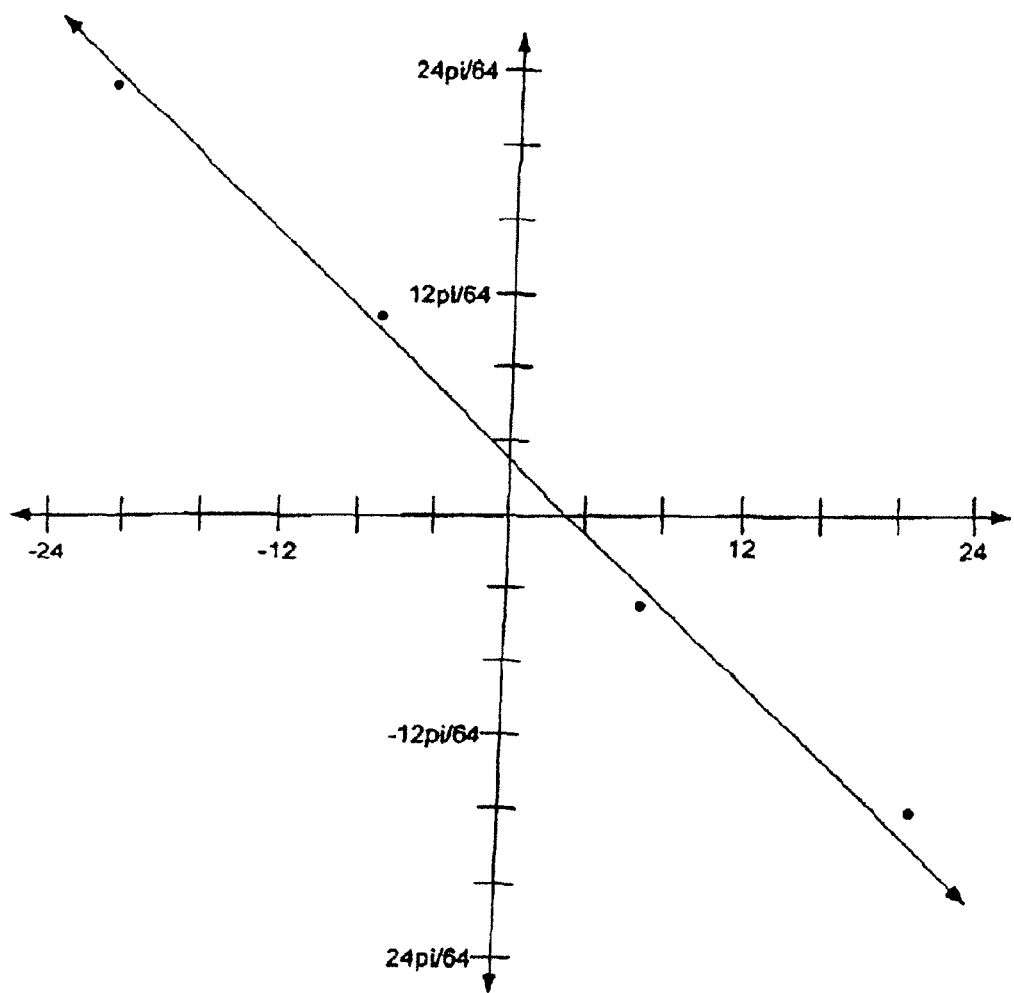
FIG. 4d illustrates a graph of the total change in phase of each pilot of a data symbol, relative to the corresponding pilot in the long symbols, versus subcarrier number in the presence of phase noise, timing drift, and frequency offset.

FIG. 4d is an illustrative graph of a possible change in phase of each pilot of a data symbol, relative to the corresponding pilot in the long symbols, versus subcarrier number in the presence of phase noise, timing drift, and frequency offset. The effect of phase noise, timing offset, and frequency offset, can be compensated for by first determining the slope and phase intercept of a line that will produce a least squares fit between the line and the actual phase plots (the four dark points on the graph). The change in phase of the subcarrier in a data symbol relative to the corresponding subcarrier in the long symbols can be determined using an equation such as $tdp_i = (slope)i + phase\ intercept$, where $tdp_i$ is the total rotation of the $i^{th}$ subcarrier relative to the $i^{th}$ subcarrier of the long symbols and i is between −26 and +26 inclusive. A unit vector with an angle equal to $-tdp_i$ is the phase correction factor that needs to be multiplied with the $i^{th}$ subcarrier in the inverse channel estimate in order to adjust the $i^{th}$ subcarrier for phase noise, frequency offset and timing offset. For example, in FIG. 4d, the slope of the least squares fit line through the pilots indicates a timing offset of one clock cycle. Moreover, the line indicates that there is frequency offset because it does not pass through point (0,0) on the graph. The intercept of the line and the phase axis divided by the time elapsed since the channel estimate was made gives an indication of the frequency offset estimation error. The inverse channel estimate can be adjusted to account for phase noise, timing offset, and frequency offset by rotating each subcarrier in the inverted channel estimate by the negation of the total rotation of the corresponding subcarrier that is derived from the least squares fit line.

Figure 5:
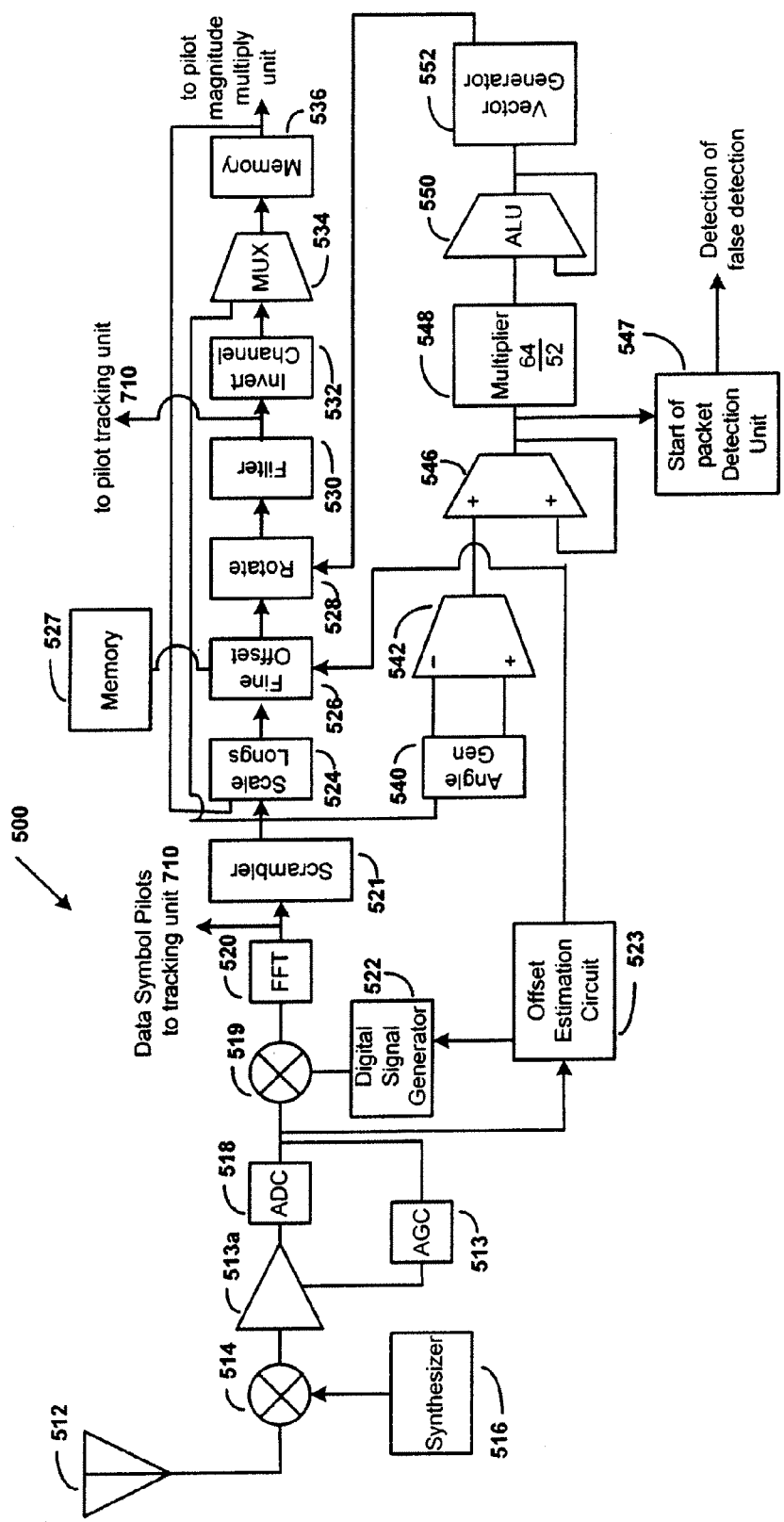
FIG. 5 illustrates a receiver in accordance with an embodiment of the present invention.

FIG. 5 illustrates a receiver in accordance with an embodiment of a system compatible with the present invention. Receiver 500 includes an automatic gain control (AGC) circuit 513, a variable gain amplifier (VGA) 513a, antenna 512, an analog mixer 514, a synthesizer 516, and an analog-to-digital converter (ADC) 518. Antenna 512 receives a packet such as packet 300 described above in the form of an analog signal transmitted by a transceiver such as transceiver 210' or 220' described above. Depending on the frequency with which transceiver 210' and 220' are communicating, synthesizer 516 produces a synthesizer signal with a frequency such that when the signal received at antenna 512 is multiplied with the synthesizer signal by mixer 514, a baseband version of the analog signal is produced by mixer 514. Since the baseband analog signal is likely to be weak, VGA 513a amplifies the baseband analog signal to produce an amplified baseband analog signal.

The ADC 518 samples and digitizes the amplified baseband analog signal to produce digital samples of the amplified baseband analog signal. Since the amplified baseband analog signal is likely to have a varying amplitude due to changes in the strength of the received signal at antenna 512, the amplitude of the digital samples are likely to vary as well. For proper operation of the subsequent stages of the receiver, it is preferable that the amplified baseband analog signal have a relatively constant amplitude before digital samples are taken. A relatively constant amplitude is achieved by AGC 513 processing the digital samples produced at the output of ADC 518 to produce a correction signal to VGA 513a to adjust the degree of amplification. Typically, the first 5 or 6 short symbols that are received are used to settle AGC 513 and are not used to produce a coarse offset estimate of the offset between the synthesizers in the transmitter and the receiver. Depending on the design of the communication system, a certain number of the 10 shorts are not needed to settle AGC 513. The shorts that are not needed for automatic gain control can be used for coarse offset estimate and for coarse symbol timing. When the analog signal received is the shorts that are not needed for automatic gain control, mixer 514 produces at its output a replica of the shorts but at baseband, and VGA 513a produces an amplified replica of the baseband short symbols. According to one embodiment, ADC 518 takes 16 samples of each amplified baseband short symbol which translates into a rate of 20 million samples/second. In an alternative embodiment, ADC 518 takes 32 samples of each short symbol which translates into a rate of 40 million samples/second. Digital mixer 519 multiplies the digital samples of the shorts with the output of digital signal generator 522. Since there can be no indication of the offset until a packet is received and analyzed, signal generator 522 initially has as an output a unit vector which has zero frequency.

Generator 522 receives from offset estimation circuit 523 estimates of the frequency offset between the receiver and transmitter. Generator 522 produces periodic signals with frequencies based on the frequency offset between the receiver and transmitter. Offset estimation circuit 523 produces a coarse offset estimate and a fine offset estimate based on the short symbol samples and long symbol samples, respectively, produced by ADC 518. When a coarse offset estimate using the short symbols is determined by offset estimation circuit 523, signal generator 522 produces a periodic digital signal with a frequency based on the coarse offset estimate for application to multiplier 519. Multiplier 519 multiplies the long symbols that follow the short symbols with the periodic signal based on the coarse offset estimate to compensate for the mismatch between the transmitter and receiver. When a fine offset estimate using the long symbols is determined by circuit 523, signal generator 522 produces a periodic digital signal with a frequency based on the fine offset estimate. Multiplier 519 multiplies the data symbols that follow the short symbols with the periodic signal based on the fine offset estimate. The operation of generator 522 and offset estimation circuit 523 is described in greater detail in commonly assigned "Method And Circuit Providing Fine Frequency Offset Estimation and Calculation" filed Sep. 24, 2001 and incorporated herein by reference.

When the first long symbol arrives, mixer 519 multiplies samples of the long symbol produced by ADC 518 with the periodic signal with frequency based on the coarse offset estimate. The product of mixer 519 is applied to fast fourier transform (FFT) unit 520. FFT unit 520 produces a frequency domain representation of the first long symbol. The frequency domain representation of the first long symbol is applied to scrambler 521. Scrambler 521 multiplies every bin of the frequency domain representation of the first long symbol (and the second long symbol when it is produced by FFT unit 520) by either +/−1 as specified in Section 17.3.3 of 802.11a D7.0 (1999), Draft Supplement to Standard for Lan/Man Part II: MAC and Phy specification. Scrambler 521 multiplies the pilots of the data symbols by +/−1 as specified by section 7.3.5.9 of 802.11a D7.0 (1999). The output of scrambler 521 is applied to an input of multiplexer 534. Multiplexer 534 outputs the frequency domain representation of the first long symbol to memory 536 for storage.

The output of scrambler 521 is also applied to angle generator 540. Angle generator 540 takes a complex value and produces an angle for each sample of the scrambled frequency domain representation of the first long symbol. According to one embodiment, generator 540 implements the cordic algorithm for doing the vector to angle conversion. The angle of each sample of the scrambled frequency domain representation of the first long symbol is applied to angle difference generator 542. According to one embodiment the frequency domain representation of the first long symbol has 128 samples. The number of samples is a design consideration and values other than 128 are possible, (e.g., 64 samples) For purposes of illustration only, the samples are numbered from −64 to +63. The samples from −26 to +26 are representative of the frequency domain representations of the signals in the 52 subcarriers. Samples −37 to −27 and 27 to 37 are representative of the frequency domain representation of the guard bands between a 802.11a channel and its adjacent channels on either side.

Beginning with sample −26 and ending with sample 26, difference generator 542 produces the difference in angle between two consecutive samples of the frequency domain representation of the first long symbol. Sample 0 is ignored because its phase is not correlated with the subcarrier phase of other samples. Consequently, difference generator 542 produces the phase difference between subcarriers −1 and +1. The differences in angles produced by difference generator 542 are applied to accumulator 546. Accumulator 546 adds up the differences in angles produced by generator 542 for samples −26 through sample 26 to produce a sum of the differences in angles for these samples (AccumAngle in Equation 2.0 below). Equation 2.0, below, represents the calculation that is performed by accumulator 546 to produce the sum of the differences in angles for the samples of the subcarriers.

$$AccumAngle = \sum_{i=-26}^{25} ((phase(subcarrier_{i+1}) - (phase(subcarrier_i) + \pi) \bmod 2\pi) - \pi$$

Equation 2.0

The $\pi) \bmod 2\pi) - \pi$ arithmetic causes each incremental difference to be within $-\pi$ and $+\pi$.

Boundary detection circuit 547 evaluates AccumAngle to determine whether a packet is being received and generates a false detection indication when AccumAngle has a value that indicates that a packet is not being received. AccumAngle should be within a certain range if in fact a long symbol is being processed. According to one embodiment, if AccumAngle is not between $-32\pi$ and $-long1\_thres*\pi$, where long1_thres can have values 0, 2, 4, or 8 (e.g., values set by software), circuit 547 generates a false detection indication, the processing of the received signal is discontinued and the receiver returns to waiting for a packet to be received. When AccumAngle is not between $-32\pi$ and $-long1\_thres*\pi$, a false detection of a packet has occurred.

AccumAngle is scaled by a factor of 64/52 by scaler 548 to reflect the sum of the differences that would have been calculated had there been 64 instead of 52 subcarriers. The sum of the differences produced by scaler 548 gives an indication of how many clock cycles the long symbol was sampled too early (i.e., the number of samples by which the original timing estimate for the start of the long symbol was off).

As indicated above, there is a linear relationship between the angle of a subcarrier and the timing offset measured in the number of clock cycles by which the sampling is early. For every 128 clock cycles subcarrier 1 completes one cycle. Consequently, for every clock cycle that subcarrier 1 is sampled early the phase of the subcarrier is rotated by $-\pi/64$. So, for example, if the symbol timing were delayed by one clock cycle, we would expect subcarrier 21 to rotate by $21\pi/64$ radians, and subcarrier −21 to rotate by $-21\pi/64$ radians.

When the second long symbol arrives and scrambler 521 produces a scrambled frequency domain representation of the second long symbol, scrambler 521 applies the scrambled frequency domain representation of the second long symbol to long symbol scaling circuit 524. Also scaling circuit 524 retrieves from memory 536 the frequency domain representation of the first symbol. According to one embodiment scaling circuit 524 averages the channel estimate for each subcarrier in the frequency domain representations of the first long symbol and second long symbol. The process of averaging is represented by equation 3.0 below.

$$AvgSubcarrier_i = \frac{FirstLongSubcarrier_i + SecondLongSubcarrier_i}{2}$$

Equation 3.0

The averaging is performed for i=−26 to +26. After averaging the frequency domain representations of the first and second long symbols to produce an averaged frequency domain representation, the averaged frequency domain representation is provided to the fine offset circuit 526. In an alternative embodiment, the averaged frequency domain representation may be scaled as described below before being provided to circuit 526.

Fine offset circuit 526 adjusts the averaged frequency domain representation to remove the effect of the residual offset between the transmitter and the receiver on the frequency domain representations of the first and second long symbols. Circuit 526 receives from offset estimation circuit 523 a fine offset estimate that is indicative of any residual offset between the transmitter and receiver and that is derived from the long symbols. Since the frequency domain representation of the first and second long symbols was derived from signals that were adjusted using the coarse offset estimate, they may contain a residual offset whose effect on the long symbols needs to be removed. As indicated above, the operation of offset estimation circuit 523 and signal generator 522 are described in greater detail in commonly assigned "Method And Circuit Providing Fine Frequency Offset Estimation and Calculation" filed Sep. 24, 2001. The operation of circuit 526 will be described in greater detail below.

According to an alternative embodiment, scaling circuit 524 adds each subcarrier in the frequency domain representation of the first long symbol to its corresponding subcarrier in the frequency domain representation of the second long symbol to produce a sum of the frequency domain representations of the first symbol and the second symbol. The process of producing the sum of the frequency domain representations of the first symbol and the second symbol is described by equation 4.0 below.

SumofSubcarrier$_i$=FirstLongSubcarrier$_i$+SecondLongSubcarrier$_i$

Equation 4.0

The summation is performed for i=−26 to +26. After summation, the values of SumofSubcarrier may be adjusted to decrease the effect of quantization noise that may be injected into the process of producing a channel estimate from the long symbols by subsequent circuits that follow circuit 524. For example, if the values of SumofSubcarrier are in block floating point format they can be shifted as described below such that they take up as much as possible the word length of the registers which perform the operations necessary to produce the channel estimate without causing overflow.

Figure 6A:
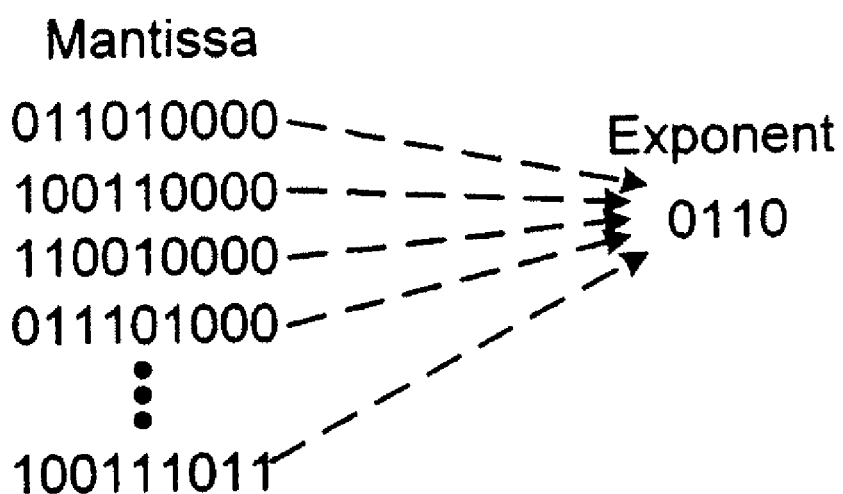
FIG. 6a illustrates numbers represented in block floating point format.

FIG. 6a illustrates numbers represented in block floating point format. In block floating point format a block of numbers (i.e., several mantissas) share one exponent. Assuming the output of unit 521 is due to receipt of the first long symbol and the second long symbol at the receiver, unit 524 puts out numbers which are the frequency domain representations of the long symbols and which are formatted in accordance with the block floating point format. The number of bits in the mantissa and exponent is a design consideration, and the present invention encompasses many different combinations.

For purposes of illustration only, according to one embodiment, the mantissa is 16 bits long and the exponent is 5 bits long. According to one embodiment, adders and multipliers which perform operations on the 16-bit numbers use 17 bit registers for the mantissas and 5 bit registers for the exponents. Since, in performing computations, it is desirable for purposes of minimizing loss of information to use as much of the word length of the registers as possible without causing an overflow, if the numbers produced by unit 521 are relatively small it is beneficial to have them scaled so that they use as much of the word length as possible. The amount of scaling is dependent upon how much 'headroom' is needed in order to avoid overflow. For example, if mantissas are 16-bits long, numbers are scaled up to the $14^{th}$ bit, with two bits left for headroom.

Figure 6B:
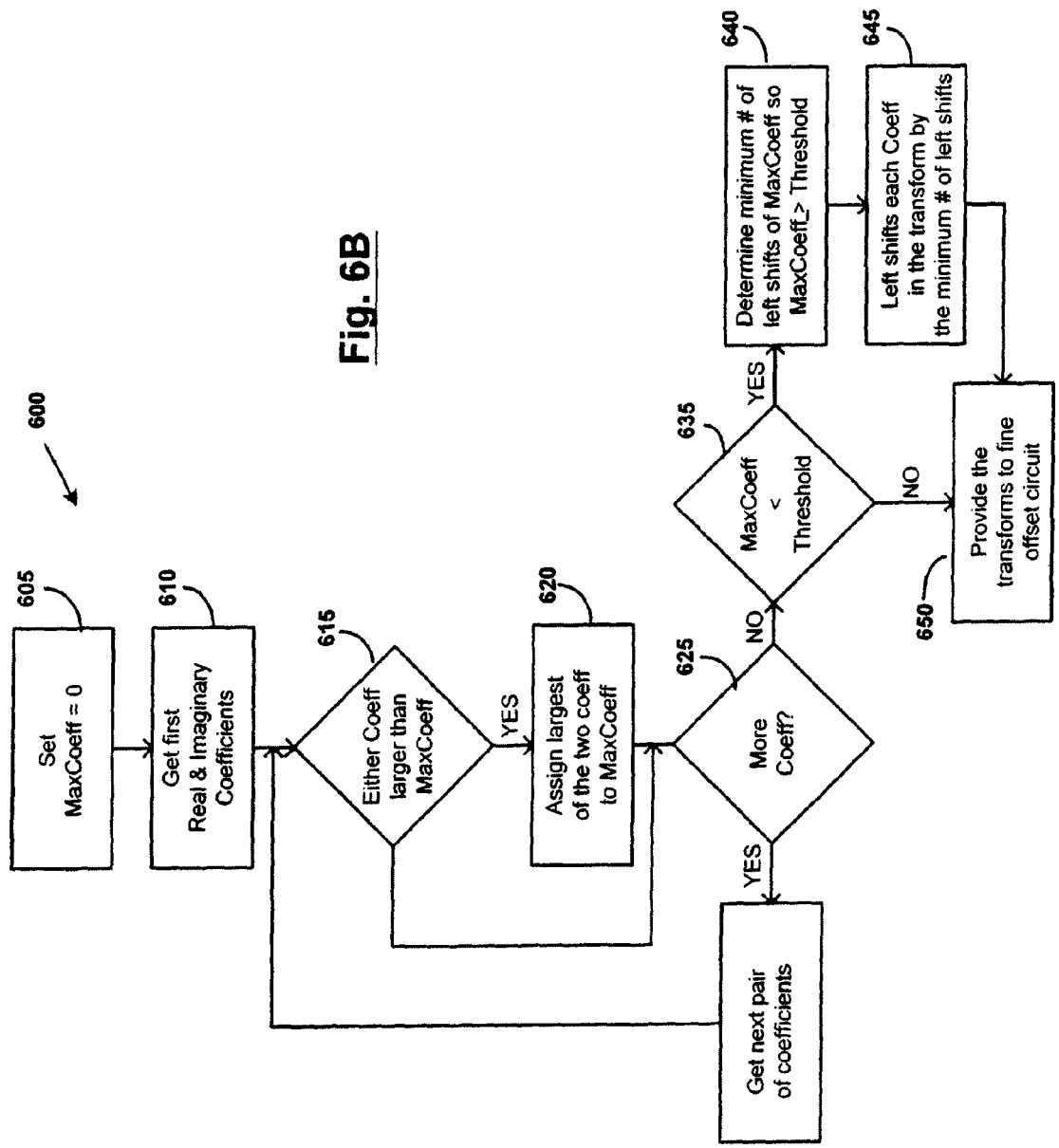
FIG. 6b illustrates a process by which a frequency domain representation is adjusted to minimize loss of information due to subsequent operations on the representation.

FIG. 6b illustrates a process for scaling a frequency domain representation of a signal to minimize loss of information. According to one embodiment, circuit 524 performs a process such as process 600. Circuit 524 sets 605 variable MaxCoeff to 0. Circuit 524 then retrieves 610 the coefficients of Sum-Subcarrier$_i$, and examines 615 the absolute value of the size of each of the coefficients to determine if either is greater than MaxCoeff. If either is larger than MaxCoeff, circuit 524 assigns 620 the largest of the two coefficients to MaxCoeff. Circuit 524 then determines 625 whether more coefficients need to be compared to MaxCoeff. If there are more coefficients to be compared, circuit 524 determines 615 whether either of the coefficients is greater than MaxCoeff. If there are no more coefficients to compare, circuit 524 determines 635 whether MaxCoeff is greater than a threshold that has been selected so that numbers can be properly represented by the registers during calculations involving the numbers. According to one embodiment, the threshold is the number which has the $14^{th}$ bit set, or 16,384. If MaxCoeff is less than the threshold, circuit 524 determines 640 the minimum numbers of left shifts of MaxCoeff that will make MaxCoeff greater than or equal to the threshold. After determining the minimum number of left shifts, circuit 524 left shifts 645 each coefficient for all SumSubcarrier$_i$ by the minimum number of left shifts and adjusts the exponent of the block to reflect that the coefficients have been left shifted. Then, circuit 524 provides the left-shifted coefficients to fine offset circuit 526. If MaxCoeff is greater than the threshold, circuit provides 650 the coefficients received from unit 524 to fine offset circuit 526.

While in the above description block floating point format is used to represent samples of signals, it should be appreciated that the present invention encompasses use of other formats, some of which may require manipulation in order to minimize information loss.

As indicated above, since the digital long samples which were fast fourier transformed by FFT unit 520 were multiplied by a signal with a frequency equal to the coarse offset estimate, the frequency domain representation of the long symbols produced by scaling circuit 524 may not be a very accurate representation of the actual transmitted signal as transformed by the channel. The inaccuracy is partly due to the presence of a residual frequency offset in the frequency domain representation of the long symbols. The residual frequency offset can be estimated and compensated for using the fine offset estimate. To compensate for the residual frequency offset, circuit 526 convolves the sum, average, or scaled average of the scrambled frequency domain representations of the individual long symbols with a frequency domain representation of a signal that has a frequency equal to the fine offset estimate, $f_o$. The frequency domain representation of a sine wave that is sampled for a finite period of time has the general shape of $sin(x)/x$, where $x=\pi fT$ and T is the duration of a long symbol (e.g., 3.2 μs). The frequency domain representation of the sine wave varies as a function of $f_o$. According to one embodiment, circuit 526 convolves three samples of the frequency domain representation of a sine wave, with frequency equal to the fine offset estimate, with the frequency domain representation of the long symbols as produced by circuit 524. The three samples of the frequency domain representation of the sine wave with frequency equal to $f_o$ are retrieved from memory 527 by fine offset circuit 526. In order to perform the convolution as rapidly as possible, memory 527 stores a table that has for various values of frequency, f, associated samples of the frequency domain representation of a sine wave with frequency equal to f. To retrieve the appropriate samples, circuit 526 indexes into the table based on $f_o$. According to one embodiment, in the event that $f_o$ falls between two values of f in memory 527, circuit 526 retrieves the samples that are associated with the two values. Circuit 526 then interpolates between each sample of one value and the corresponding sample of the other value to produce an interpolated sample value. It should be appreciated that in an alternative embodiment interpolation may not be necessary because the table would have a very small step size between the various values of $f_o$ making it acceptable to choose the samples for the $f_o$ that is closest to the fine offset estimate being used as an index into the table. Circuit 526 then convolves the interpolated sample values with the frequency domain representation of the long symbols as received from scaling circuit 524. The output of circuit 526 is a frequency domain representation of the long symbols as received at the receiver and as adjusted for frequency offset between the transmitter and receiver. The output of circuit 526 is then provided to rotator 528.

As indicated above, if the timing of the long symbols is early, a least squares fit of a line through the phases of the pilots will be a line with a negative slope. It is very likely—and even desirable—that the sampling of the long symbols be early. Consequently, a plot of the phases of the pilots of the frequency domain representation of the long symbols produced by circuit 526 is likely to resemble four points which can have a least squares fit line with a negative slope passed between them, as in FIG. 4c. To produce a channel estimate with a flat phase response as a baseline, the phase of each subcarrier in the frequency domain representation of the long symbols needs to be corrected by multiplying each subcarrier by a vector whose angle is a function of the subcarrier number and the number of clock cycles the sampling was early.

To produce the flat phase response, arithmetic logic unit (ALU) 550 calculates the phase correction for subcarrier −26 (i.e., +26)π(number of samples early)/64) and provides it to vector generator 552 which produces a vector with an angle equal to the phase correction for subcarrier −26. Rotator 528 then multiplies the vector produced by generator 552 with the complex value for subcarrier −26 that is produced by fine offset circuit 526. To calculate the phase correction for subcarrier −25, ALU 550 adds −π(number of samples early)/64 to the phase correction for subcarrier −26. Vector generator 552 provides a vector with an angle equal to the phase correction for subcarrier −25 to rotator 528. ALU 550 repeats the process of adding −π(number of samples early)/64 to the previous phase correction that was calculated in order to generate the phase corrections up to subcarrier +26.

The output of the rotator 528 is a frequency domain representation of the long symbols which has been adjusted for both frequency offset and timing offset (i.e., flat phase response). Since the frequency domain representation produced by rotator 528 is likely to be noisy, according to one embodiment, the output of rotator 528 is filtered by a 7-tap finite impulse response filter (FIR) 530. One of ordinary skill in the art would appreciate that the nature of the FIR is a design consideration and that the present invention encompasses FIR with a number of taps other than 7 and even filters other than FIRs.

The smoothed or filtered output of filter 530 is the channel estimate and it is inverted by inverter 532 to produce an inverted channel estimate. The inverted channel estimate is applied to multiplexer 534 which forwards it to memory 536 for storage and later use in decoding data symbols. The process of calculating the inverted channel estimate is described by equation 5.0 below.

$$ChannelInverse_i = \frac{1}{I_i + jQ_i} = \frac{I_i - jQ_i}{I_i^2 + Q_i^2} \qquad \text{Equation 5.0}$$

Where i varies from −26 to +26 and $I_i+jQ_i$ is the complex output of filter 530 for the $i^{th}$ subcarrier.

Returning to the output of filter 530, in addition to the filtered samples of the data subcarriers, filter 530 produces four filtered pilot signals. The four filtered long symbol pilot signals are sent to a pilot tracking unit that also receives the pilot signals of data symbols and uses the long symbol and data symbol pilots to track both phase and magnitude changes in order to compensate for magnitude changes, phase noise, timing drift, and frequency offset error between the receiver and transmitter.

Figure 7:
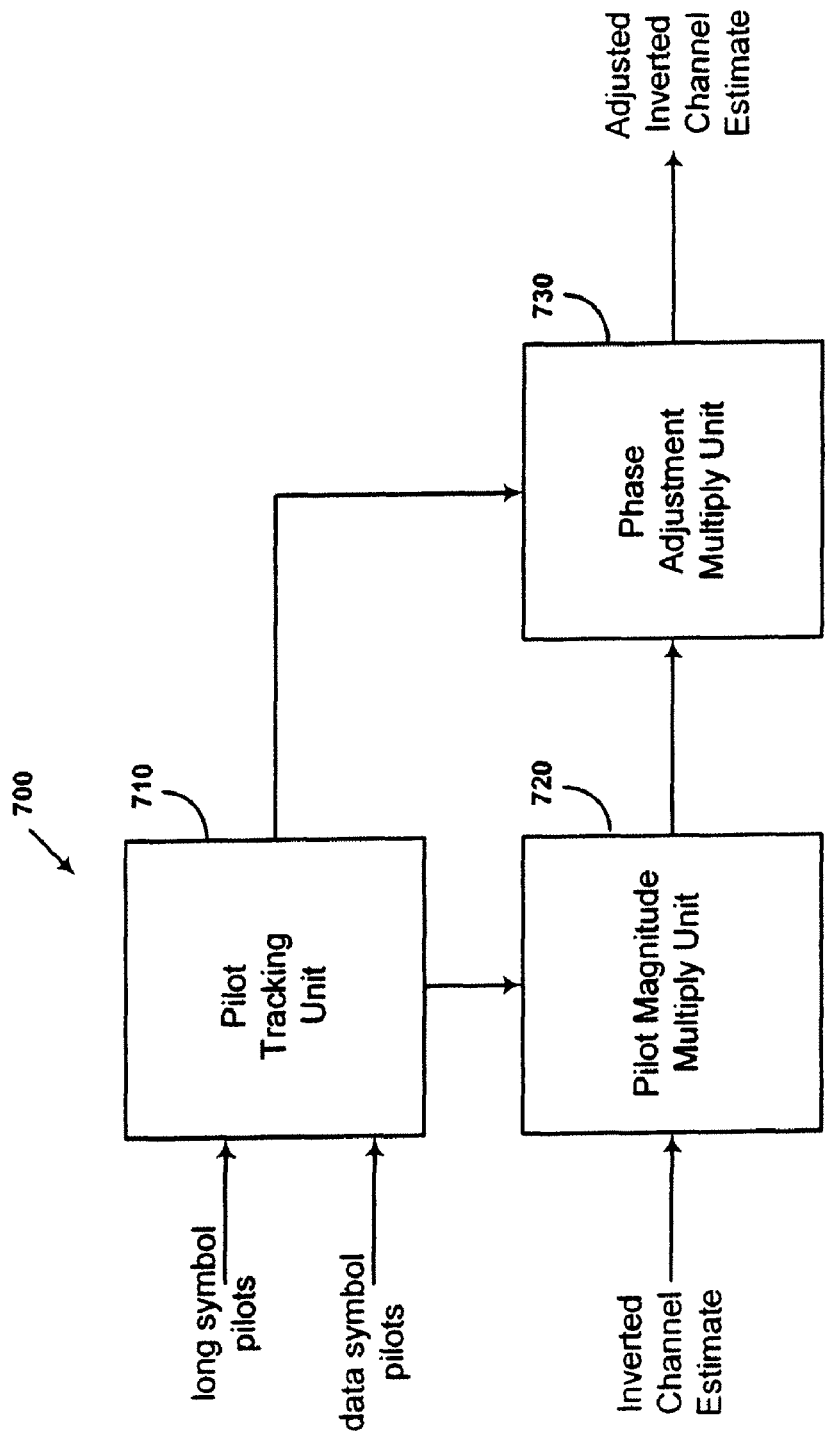
FIG. 7 illustrates a phase and magnitude tracking apparatus that produces an inverted channel estimate that has been adjusted for both phase and magnitude changes.

FIG. 7 illustrates a phase and magnitude tracking apparatus that produces an inverted channel estimate that has been adjusted for both phase and magnitude changes. Apparatus 700 includes pilot tracking unit 710 which tracks amplitude changes and phase changes. The phase of the pilots is not the only thing that changes during a frame of multiple data symbols in an OFDM signal. The magnitudes of the pilots may also change. In order to ensure proper decoding of data, according to one embodiment pilot magnitude variations are tracked and the inverted channel estimate is adjusted.

During receipt of a packet, the signal magnitude may vary due to the analog circuits or environmental factors. To account for pilot magnitude variations, a reference power must be first computed and saved. Unit 710 sums the powers of the 4 pilots of the long symbols and assigns them to a reference_power variable. The equation below represents calculation of the reference_power.

$$Power = \sum_{i=-21,-7,7,21} real(pilot_i)^2 + imag(pilot_i)^2$$

According to one embodiment, pilot power is then computed for the pilots of the SIGNAL symbol (data_or_signal_symbol_power) using the above equation and is compared to reference_power. The inverted channel estimate is scaled by scaling factor Mag which is represented by the equation below.

$$Mag = \sqrt{\frac{reference\_power}{data\_or\_signal\_symbol\_power}}$$

In the first data symbol, the pilot power of the pilots of the data symbol is compared to the reference power and the inverted channel estimate is scaled by the factor Mag using multiply unit 720. According to one embodiment, for data symbols after the first data symbol, the power of the pilots for the data symbol is filtered with an infinite impulse response filter: for example, filter_power[n+1]=presentdatasymbolpower/8+7*filter_power[n]/8. filter_power[n+1] is compared to the reference power, and Mag is calculated using filter_power[n+1]. The inverted channel estimate is then scaled by the factor Mag using multiply unit 720.

The scaling factor can be more easily evaluated in a base 2 system by performing the scale calculation in the log domain:

$$\lg Mag = 0.5(\log 2(reference\_power) - \log 2(data\_or\_signal\_power));$$

and $$Mag = 2^{\lg Mag}$$

In a hardware implementation, the integer part of log 2(n) is determined from the number of leading zeroes of the input; the fractional part via lookup table of the normalized input. According to one embodiment, the Mag output is computed in floating point format, the mantissa via lookup table of the lower bits of l gMag, and the exponent from the upper bits of l gMag. The Mag output is provided to multiplier 720 which scales the inverted channel estimate and provides the scaled inverted channel estimate to multiply unit 730.

Unit 710 also tracks phase changes using a single, unified mechanism. The mechanism involves, for each pilot of a data symbol, accumulation of the total change in phase relative to the phase observed in the long symbols to produce a total delta pilot (tdp). Making a least squares fit of the four tdps (one for each pilot) allows the tdp for each data subcarrier to be determined by an equation for a line that has the slope and phase offset determined by the least squares fit. The negated value of the tdp calculated for a given subcarrier is the amount by which the corresponding subcarrier of the inverted channel estimate (determined above at the output of memory 536) should be rotated.

As indicated above, pilot tracking unit 710 receives from filter 530 the complex values (I and Q components) for each of the four pilots in the long symbols. Pilot tracking unit 710 keeps track of the phase change between the pilots in the long symbols and the pilots in the data symbols. By keeping track of the phase changes, pilot tracking unit 710 is able to provide, for each data symbol. that is received, indications of how the inverted channel estimate based on the long symbols needs to be adjusted to compensate for the timing drift, phase noise, and frequency offset that each data symbol is experiencing. To keep track of the phase changes, unit 710 maintains 7 variables for each of the pilots:

p=pilot phase of the previous symbol;

phi=pilot phase of the most recent symbol;

dp=delta_pilot, (the difference in pilot phase between two consecutive symbols);

ta=the amount of phase that needs to be added or subtracted from the phases of pilots due to timing having slipped from the desired timing backoff.

$$ta = \frac{subcarrier\_number(timing\_adjustment)\pi}{64}$$

where subcarrier number takes on the values (−21, −7, +7, +21) and timing_adjustment is the number of clock cycles that the timing has slipped from the timing offset for the long symbols (permissible values are −1 (symbol timing sped up by a clock cycle), 0 (no timing adjustment), and +1 (symbol timing delayed by a clock cycle).

ndp=((phi−(p+ta)+π)mod 2π)−π (new change in pilot phase, −π<=ndp<+π);

ndp=next delta pilot (delta pilot for the next symbol).

wrap_adjust=adjustment made to total change in phase for a pilot when the phase change over two consecutive pilots is greater than π radians. Condition of phase change over two consecutive pilots is greater than π radians is detected by evaluating pwt below and comparing it to the sum of ndp and dp:

pwt=π(1+pilot_wrap_threshold>>4), pilot_wrap_threshold is a configuration register which, according to one embodiment, holds values between 0 and 15 and>> is a right shift operation;

if(ndp+dp)>=pwt then wrap_adjust=−2π
else if(ndp+dp)<−pwt then wrap_adjust=2π
else wrap_adjust=0.

tdp=total amount of rotation of a pilot compared to the phase of the pilot from the long symbols;

tdp=(tdp+ta)+ndp+wrap_adjust.

After tdp is evaluated, previous pilot, p, and delta_pilot, dp, are advanced for each of the four pilots: i.e., p=phi, and dp=ndp.

After tdp is evaluated for each pilot, the least squares fit of the total delta pilots (tdp) is determined. The least squares fit produces a slope and a phase intercept (i.e., the tdp for the 0 data subcarrier) that allows calculation of the tdp of each data subcarrier by evaluating the equation of a line. A tdp for any data subearrier is $tdp_i$=(slope)i+phase intercept. The slope is the variable EstimatedSlope below, and the phase intercept is the variable EstimatedOffset below. The equations for the least squares fit of n data points are:

$$EstimatedSlope = \frac{\sum X_i Y_i - \frac{1}{n}\sum X_i \sum Y_i}{\sum X_i^2 - \frac{1}{n}(\sum X_i)^2}$$

$$EstimatedOffset = \frac{1}{n}\left(\sum Y_i - EstimatedSlope \sum X_i\right)$$

$X_i$ are subcarrier numbers which have the values (−21, −7, 7, 21). $Y_i$ are the total delta pilots, and n=4. The above equations can be simplified because the pilot subcarriers are constant (−21, −7, 7, 21). Thus, $\Sigma X_i$=−21−7+7+21=0

$\Sigma X_i^2$=(−21)²+(−7)²+7²+21²=980

$\Sigma X_i Y_i$=−21tdp$_0$−7tdp$_1$+7tdp$_2$+21tdp$_3$

Applying the above simplifications, results in $$EstimatedSlope = \frac{-3tdp_0 - tdp_1 + tdp_2 + 3tdp_3}{140}$$

$$EstimatedOffset = \frac{1}{4}(tdp_0 + tdp_1 + tdp_2 + tdp_3)$$

Where, $tdp_0$ is the total delta pilot for subcarrier −21, $tdp_1$ is the total delta pilot for subcarrier −7, $tdp_2$ is the total delta pilot for subcarrier 7, and $tdp_3$ is the total delta pilot for subcarrier 21.

According to one embodiment, in the event a pilot magnitude is low, its phase is determined by either interpolation or extrapolation from the phases of its two neighboring pilots and then the least squares fit is performed using the equations above as when all pilots are present and have sufficiently large magnitudes. Alternatively, a different least squares equation can be implemented for each of the four cases in which a pilot is ignored (i.e., only three points are used).

If $tdp_0$ is to be discarded, $tdp_0$=2$tdp_1$−$tdp_2$.
If $tdp_1$ is to be discarded, $tdp_1$=($tdp_0$+$tdp_2$)/2
If $tdp_2$ is to be discarded, $tdp_2$=($tdp_1$+$tdp_3$)/2
If $tdp_3$ is to be discarded, $tdp_3$=2$tdp_2$−$tdp_1$ According to one embodiment the EstimatedSlope and EstimatedOffset are used to adjust the inverted channel estimate. The tdp for the $i^{th}$ data subcarrier can be determined using the following equation: $tdp_i$=(EstimatedSlope)i+EstimatedOffset, where i is between −26 and +26. For each data carrier a vector with an angle equal to −$tdp_i$ is provided to multiply unit 730. Unit 730 multiplies each of the data carriers in the inverted channel estimate, produced by multiply unit 720, by its corresponding vector with angle equal to −$tdp_i$. The output of unit 730 is an inverted channel estimate which has been adjusted for magnitude, frequency offset, timing drift, and phase noise.

According to one embodiment, the EstimatedOffset is stored for the previous two data symbols so that the EstimatedOffset can be filtered and the filtered offset can be used to determine the correction needed for each data subcarrier of each data symbol. This means that the first data symbol and the SIGNAL symbol do not have filtering. The EstimatedOffset for the previous two data symbols is indicated by offset (i−1) and offset (i−2). The EstimatedOffset for the current symbol is indicated by offset (i). The filtered offset, according to one embodiment, is given by the equation below.

$$offsetfiltered_i = \frac{offset(i)}{2} + \frac{offset(i-1)}{4} + \frac{offset(i-2)}{4}$$

According to one embodiment, the EstimatedSlope is filtered and the EstimatedSlope for the previous two symbols is stored. The filtered EstimatedSlope is used to determine the correction needed for each data subcarrier of each data symbol. The filter, according to one embodiment, is the same as the offset filter with the exception that timing adjustments between symbols affects how the slopes before the timing adjustments are handled. When a timing adjustment is made, the slope is expected to change by π/64. Delaying by a sample produces +π/64, advancing by a sample produces −π/64. Without timing adjustments, an example filter is $$slopefiltered_i = \frac{slope(i)}{2} + \frac{slope(i-1)}{4} + \frac{slope(i-2)}{4}$$

With a timing adjustment between symbol 'i−1' and 'i', slope(i−1) and slope(i−2) should be adjusted by +/−π/64. With weights of ¼ and ¼ for slope(i−1) and slope(i−2), the net effect is +/−π/128. With a timing adjustment between symbol 'i−2' and 'i−1', slope(i−2) should be adjusted by +/−π/64. With a weight of ¼ for slope(i−2), the net effect is +/−π/256.

Timing adjustments based on 'i−3' pilots will take effect between symbols 'i−2' and 'i−1'. Timing adjustments based on 'I−2' pilots will take effect between symbols 'I−1' and 'I'. The hardware must remember the previous three timing adjustments. The slope is expected to increase or decrease as a function of the frequency offset between transmitter and receiver. The frequency offset implies a timing offset drift, which ultimately is responsible for the change in slope. Since we estimate this frequency offset, we could use this estimate to remove the bias caused by the one-sided filters. However, even at 40 parts per million in frequency error between the receiver and transmitter, the error incurred for the most extreme frequency subcarrier (+/−26), is only 0.35 degrees, and so may be ignored according to one embodiment.

Once the EstimatedOffset and the EstimatedSlope have been filtered and offsetfiltered and slopefiltered computed, the estimated tdp for any data carrier is calculated by $tdp_i =$ (slopefiltered)i+offsetfiltered, where i is between −26 and +26. For each data carrier a vector with an angle equal to $-tdp_i$ is provided to multiply unit 730. Unit 730 multiplies each of the data carriers in the inverted channel estimate, produced by multiply unit 720, by its corresponding vector with angle equal to $-tdp_i$. The output of unit 730 is an inverted channel estimated which has been adjusted for magnitude, frequency offset, timing drift, and phase noise.

As indicated above, timing adjustments may be necessary when the sampling is off by a clock. The timing uncertainty can be inferred by unit 710 from the slope of the pilots. The pilots will have a slope because it is desirable to sample the data symbols several samples early. According to one embodiment, a timing_backoff register specifies the number of samples to back off from the end of each symbol. Consequently, the pilots will have an expected slope which, for a flat channel, is −(n)timing_backoff/64. However, the transmitter may have a faster or slower clock than the receiver.

With a positive frequency offset, the transmitter has a faster clock, and the receiver will keep slipping later, making the slope flatter. Whenever the slope becomes flat enough, as indicated by the condition below, the timing_adjustment is set to −1 by unit 710. The value π/128 is referred to herein as a timing threshold.

slope+(π)timing_backoff/64>=π/128

With a negative frequency offset, the transmitter has a slower clock. The receiver will keep advancing earlier, making the slope steeper. Whenever the slope becomes steep enough, as indicated by the condition below, the timing_adjustment is set to +1 by unit 710.

slope+(π)timing_backoff/64<π/128

According to one embodiment the residual frequency offset between the receiver and the transmitter, after the fine offset estimate has been calculated, is estimated by pilot tracking unit 710 using the offsetfiltered for two or more symbols. The residual frequency offset is calculated according to one embodiment using the following equation Residual frequency offset=(offsetfiltered$_{y+Numsymbols}$−offsetfiltered$_y$)/(160*Numsymbols)

160*Numsymbols is the number of clocks over which the phase measurement is made: depending on the modulation used, the Numsymbols can be 2, 4, 8, 16 symbols. The present invention is not limited to the aforementioned values for Numsymbols. One of ordinary skill should appreciate that Numsymbols is application dependent. The residual frequency offset is provided to signal generator 522. According to one embodiment, offsetfiltered$_{y+numsymbols}$ is the filtered offset for a symbol Numsymbols symbols later than offsetfiltered$_y$, the filtered offset for the first data symbol in a frame. According to an alternative embodiment, offsetfiltered$_y$ is the filtered offset for the second long symbol. It should be appreciated that alternative embodiments are possible and encompassed by the present invention. The residual frequency offset equation provided above can be used for any two symbols for which a filtered offset has been determined.

Turning next to the innovative method and system of the present invention, the invention utilizes the interface path that exists for transferring received data from the PHY to the MAC to forward additional signal characteristic information for testing and performance enhancement. This path can be configured to add additional information to the receive frame data (either pre-appended, as preferred, or post-appended, or even interspersed). The utilized information is computed, as described above, in the receiver and includes, for example, channel estimate information, frequency offset estimate information between a transmitter and a receiver, and timing offset information. In addition, FFT output information, such as pilot tracking information, for every symbol of the frame (not just information based on the channel estimates) may be captured and forwarded as well in the form of raw FFT outputs or channel-corrected FFT outputs, with or without the adjustments introduced by pilot tracking.

Figure 8:
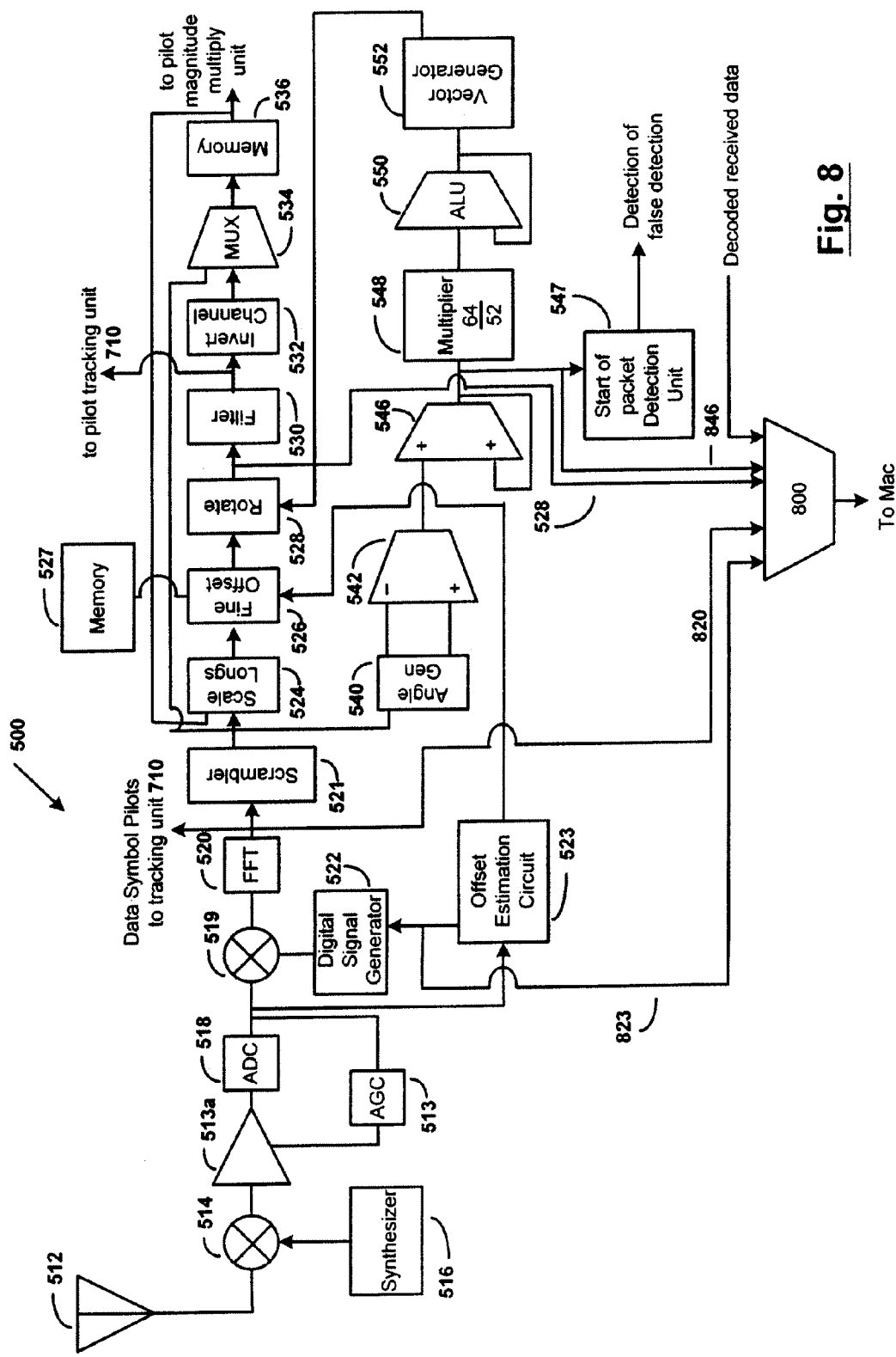
FIG. 8 provides an illustration of the data extracted at the PHY layer and forwarded to the MAC layer according to the present invention.

Referring to FIG. 8, for a manufacturing test, the measured frequency offset generated by block 523 is forwarded along line 823 to pre-append unit 800 and then to the MAC unit, where the information is extracted and used to evaluate crystal and synthesizer quality. Channel estimate information, calculated from each of the two long training symbols or from an average of the two, can be forwarded from the output of rotate unit 528 and forwarded along line 828 to help identify undesirable frequency response characteristics, such as spurs, filter rolloff, symbol timing, channel estimate accuracy, inter-carrier interference, I-Q mismatch, coarse frequency estimate accuracy, AGC scaling accuracy and frequency offset accuracy, carrier leakage and DC offset, among others.

By appending timing offset information from the output of accumulator 546 to the forwarded receive data along line 846, the performance of symbol timing algorithms can be tested. Also, by appending and forwarding the output of FFT 520 along line 820, every received symbol can be used to measure low-frequency phase noise (crystal bounce).

By using access to channel estimate information during circuit operation, the system of the invention can also be used to better select data rate and other receiver algorithm characteristics, choosing which of a plurality of available access points to affiliate with, or antenna selection. The channel estimates can be used as a measure of channel quality. For example, if the channel has a difficult multipath profile, thereby limiting the ability to receive high data rates, a lower data rate could be selected (rolled back) or a different antenna could be tried (antenna diversity). The decision to switch rate or antenna is preferably made at the MAC layer in a manner based upon the channel estimates gathered from one or more frames.

Also during circuit operation, statistics can be gathered on the measured frequency offset captured across multiple frames. These statistics can be used to guide the frequency estimation in subsequent frames. For example, average together the measured frequency offset estimates from the previous "n" frames, and use this for the frequency offset estimate of the next frame. The receiver can continue to measure frequency offset in the normal way, thereby building up more statistics, but it would use the averaged estimates from the previous frames, for example. This approach is particularly advantageous in point-to-point applications where the transmitter-receiver pair is constant.

In addition, channel estimates are preferably monitored across multiple frames and used to guide channel estimation in subsequent frames. This is particularly helpful for system performance where the channel is constant, or very slowly changing across multiple frames (such as in fixed wireless applications). An alternative approach utilizes previous channel estimates as a guide only for the magnitude, but not the phase of the current channel estimates.

Therefore the present invention can be implemented in a number of different ways. For example, in a testing, analysis, or other functions in different environments (e.g., home, office, factory, vehicle, outdoors, etc.), the frequency estimate may be used to evaluate crystal and synthesizer quality. The testing and analysis is particularly useful in environments that have particular characteristics that change or otherwise affect the channels (e.g., office walls, multi-path, etc.). The channel estimate may be used to help identify undesirable frequency response characteristics. FFT outputs are well suited to evaluate low-frequency phase noise. In addition, the channel estimate may be used to better understand what kinds of channels exist in "typical" home/office environments. Any of this or other items described herein may be used to help guide receiver algorithm development. Also, timing offset data may be used to better understand symbol timing algorithms.

In another example, during normal radio operation, the channel estimates may be used to guide rate, antenna, and/or access point selection. The channel estimates may be analyzed (e.g., averaged) across multiple frames to improve channel estimation. Further, averaging frequency estimates across multiple frames helps to determine a more statistically accurate frequency estimate.

And, although other implementations may be used, the present invention includes forwarding radio signal characteristics or other PHY level data to the MAC using existing data path. Therefore, no special interface to the MAC (or other higher level) is required. Although preferably applied in devices of wireless applications, the present invention may be applied to wired applications and devices.

Thus, methods and apparatus for improving radio device testing and receive operation have been described. Although the present invention has been described with reference to specific exemplary embodiments, it will be evident to one of ordinary skill in the art that various modifications and changes may be made to these embodiments without departing from the broader spirit and scope of the invention as set forth in any claims filed hereafter. Accordingly, the specification and drawings are to be regarded in an illustrative rather than a restrictive sense.

We claim:

1. A method for improving performance of a radio link between radio communication devices, the method comprising:
   determining radio signal characteristic data at a physical (PHY) layer of a radio communication device;
   forwarding the radio signal characteristic data to a Media Access Control (MAC) layer for analysis, the radio signal characteristic data being appended to a data packet; and
   modifying the radio link based on the MAC layer analysis.

2. The method of claim 1, wherein the determining comprises analysis of at least one of a channel estimate, frequency offset, and timing offset, pilot tracking for each symbol, and frequency domain information for each symbol.

3. The method of claim 2, wherein the radio signal characteristic data follows the path of a receive frame being transferred to the MAC layer.

4. The method of claim 1, wherein the determining comprises determining a channel estimate by comparing a frequency domain representation of a transmitted signal to a frequency domain representation of the transmitted signal as received by the radio link.

5. The method of claim 1, wherein the determining comprises determining pilot tracking information for every symbol of a frame.

6. The method of claim 5, wherein the pilot tracking information comprises one of raw FFT outputs and channel corrected FFT outputs.

7. The method of claim 1, wherein the radio link comprises a plurality of antennas.

8. The method of claim 7, wherein the radio signal characteristic data is a channel estimate.

9. The method of claim 7, wherein the modifying comprises determining an antenna selection between the plurality of antennas for the radio link.

10. The method of claim 9, wherein the radio signal characteristic data is a channel estimate.

11. The method of claim 1, wherein the modifying comprises averaging the radio signal characteristic data across N frames and applying the average to the radio link.

12. The method of claim 11, wherein the radio signal characteristic data is one of a channel estimate and a frequency estimate.

13. A device comprising:
   a radio device having a physical (PHY) layer and a Media Access Control (MAC) layer;
   a radio characteristic identifier block configured to identify at least one radio characteristic at the PHY layer; and
   an attach unit configured to attach a radio characteristic identifier to a receive data frame being transferred from the PHY layer to the MAC layer.

14. The device of claim 13, wherein the radio characteristic identifier block comprises an offset estimation circuit configured to calculate an offset between a received signal and a reference frequency.

15. The device of claim 13, wherein the radio characteristic identifier follows a same path as the receive frame from the PHY layer to the MAC layer.

16. The device of claim 13, wherein the radio characteristic identifier is forwarded along a same path as a receive frame to transfer attached data from the PHY layer to the MAC layer.

17. The device of claim 13, further comprising:
   a synthesizer analysis block configured to evaluate a quality of a synthesizer of the radio device based on the radio characteristic identifier.

18. The device of claim 13, further comprising:
   a crystal analysis block configured to evaluate a quality of a crystal of the radio device based on the attached data.

19. The device of claim 13, further comprising:
   an analysis block configured to evaluate a quality of the radio device based on the radio characteristic identifier.

20. The device of claim 13, wherein the MAC layer uses channel estimates from one or more frames to switch antennas.

21. The device of claim 13, wherein the MAC layer resides on a separate circuit from the PHY layer.

22. A method for improving performance of a radio link between radio communication devices, the method comprising:
   determining radio signal characteristic data at a physical (PHY) layer of a radio communication device;
   forwarding the radio signal characteristic data to a Media Access Control (MAC) layer for analysis, the radio signal characteristic data being interspersed within a data packet; and
   modifying the radio link based on the MAC layer analysis.

23. The method of claim 22, wherein the determining comprises analysis of at least one of a channel estimate, frequency offset, and timing offset, pilot tracking for each symbol, and frequency domain information for each symbol.

24. The method of claim 23, wherein the radio signal characteristic data follows the path of a receive frame being transferred to the MAC layer.

25. The method of claim 22, wherein the determining comprises determining a channel estimate by comparing a frequency domain representation of a transmitted signal to a frequency domain representation of the transmitted signal as received by the radio link.

26. The method of claim 22, wherein the determining comprises determining pilot tracking information for every symbol of a frame.

27. The method of claim 26, wherein the pilot tracking information comprises one of raw FFT outputs and channel corrected FFT outputs.

28. The method of claim 22, wherein the radio link comprises a plurality of antennas.

29. The method of claim 28, wherein the radio signal characteristic data is a channel estimate.

30. The method of claim 28, wherein the modifying comprises determining an antenna selection between the plurality of antennas for the radio link.

31. The method of claim 30, wherein the radio signal characteristic data is a channel estimate.

32. The method of claim 22, wherein the modifying comprises averaging the radio signal characteristic data across N frames and applying the average to the radio link.

33. The method of claim 32, wherein the radio signal characteristic data is one of a channel estimate and a frequency estimate.

* * * * *